US012712226B2

(12) United States Patent
Yong et al.

(10) Patent No.: US 12,712,226 B2
(45) Date of Patent: Aug. 18, 2026

(54) SECONDARY BATTERY

(71) Applicant: Samsung SDI Co., Ltd., Yongin-si (KR)

(72) Inventors: Jun Sun Yong, Yongin-si (KR); Hyun Soo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 698 days.

(21) Appl. No.: 18/158,966

(22) Filed: Jan. 24, 2023

(65) Prior Publication Data

US 2023/0238621 A1 Jul. 27, 2023

(30) Foreign Application Priority Data

Jan. 27, 2022 (KR) ........................ 10-2022-0012599

(51) Int. Cl.
*H01M 50/171* (2021.01)

(52) U.S. Cl.
CPC ................................ *H01M 50/171* (2021.01)

(58) Field of Classification Search
CPC .. H01M 50/103; H01M 50/209; H01M 50/15; H01M 50/147; H01M 50/30; H01M 2200/20; H01M 50/176; H01M 50/578; H01M 50/213; H01M 2220/30; H01M 10/647; H01M 50/325; H01M 50/242; H01M 50/188; H01M 50/24; H01M 50/375; H01M 50/171; H01M 50/169; H01M 50/3425; Y02E 60/10
See application file for complete search history.

(56) References Cited

U.S. PATENT DOCUMENTS

| | | | | |
|---|---|---|---|---|
| 8,524,384 B2 | | 9/2013 | Lee et al. | |
| 8,668,998 B2 * | | 3/2014 | Guen | H01M 50/159 429/163 |
| 8,808,907 B2 * | | 8/2014 | Matsuo | H01M 50/211 206/703 |
| 11,108,095 B2 | | 8/2021 | Guen | |
| 11,404,743 B2 | | 8/2022 | Park et al. | |
| 11,482,757 B2 | | 10/2022 | Lee et al. | |
| 2011/0305929 A1 * | | 12/2011 | Byun | H01M 50/147 429/61 |
| 2012/0214029 A1 | | 8/2012 | Lee et al. | |
| 2014/0186692 A1 * | | 7/2014 | Kim | H01M 10/0422 429/185 |

(Continued)

FOREIGN PATENT DOCUMENTS

| | | | |
|---|---|---|---|
| CN | 209880668 U * | 12/2019 | H01M 50/271 |
| CN | 217589305 U * | 10/2022 | Y02E 60/10 |

(Continued)

OTHER PUBLICATIONS

Korean Office Action issued in corresponding KR Application No. 10-2022-0012599, dated Jan. 15, 2026, 5 pages.

*Primary Examiner* — Kaity V Chandler
(74) *Attorney, Agent, or Firm* — Womble Bond Dickinson (US) LLP

(57) ABSTRACT

A secondary battery includes: a case having a space therein; an electrode assembly accommodated in the space in the case; and a cap plate coupled to and sealing the case. The cap plate has a recessed portion and a vent hole in the recessed portion.

9 Claims, 5 Drawing Sheets

(56) References Cited

U.S. PATENT DOCUMENTS

| | | | | |
|---|---|---|---|---|
| 2014/0193678 | A1* | 7/2014 | Kim | H01M 50/507 429/72 |
| 2014/0242426 | A1* | 8/2014 | Kwak | H01M 50/538 429/61 |
| 2014/0287286 | A1* | 9/2014 | Miyawaki | H01M 50/264 429/90 |
| 2015/0086816 | A1* | 3/2015 | Park | H01M 50/367 429/53 |
| 2015/0118531 | A1* | 4/2015 | Kondo | B21J 13/02 429/89 |
| 2015/0125720 | A1* | 5/2015 | Fujii | H01M 50/209 429/56 |
| 2019/0207185 | A1 | 7/2019 | Lee et al. | |
| 2020/0091570 | A1 | 3/2020 | Guen | |
| 2020/0303700 | A1 | 9/2020 | Park et al. | |

FOREIGN PATENT DOCUMENTS

| | | | | | |
|---|---|---|---|---|---|
| JP | 2014102935 | A | * | 6/2014 | |
| KR | 10-2012-0096354 | A | | 8/2012 | |
| KR | 10-2018-0031136 | A | | 3/2018 | |
| KR | 20180091301 | A | * | 8/2018 | H01M 2/345 |
| KR | 10-2020-0032989 | A | | 3/2020 | |
| KR | 10-2198047 | B1 | | 1/2021 | |
| KR | 10-2260826 | B1 | | 6/2021 | |
| KR | 102412028 | B1 | * | 6/2022 | H01M 50/103 |

* cited by examiner

FIG. 4

| Improved structure | Specification (mm) | | | Cross-sectional moment ($mm^4$) |
|---|---|---|---|---|
| | t | a | b | |
| X | 2.5 | 30.14 | 14.2 | 18.9 |
| X | 2.0 | | | 9.5 |
| O | 2.0 | | | 38.7 |
| X | 3.1 | | | 37.5 |

| A type 2.5t | A type 2.0t | A type 2.0t+rigidity reinforced | B type 2.0t |
|---|---|---|---|
| 12.2 | 7.7 | 15.4 | 10.1 |

SECONDARY BATTERY

CROSS-REFERENCE TO RELATED APPLICATION

This application claims priority to and the benefit of Korean Patent Application No. 10-2022-0012599, filed on Jan. 27, 2022, in the Korean Intellectual Property Office, the entire content of which is incorporated herein by reference.

BACKGROUND

1. Field

Aspects of embodiments of the present disclosure relate to a secondary battery.

2. Description of the Related Art

Different from a primary battery, a secondary battery is a battery that is designed to be repeatedly charged and discharged.

A small-capacity secondary battery can be used for portable electronic devices, such as a mobile phone, a notebook computer, and a camcorder, while a large-capacity secondary battery can be used as a power source for driving a motor of a hybrid vehicle or an electric vehicle.

A secondary battery generally includes an electrode assembly for charging and discharging, a case accommodating the electrode assembly, a cap plate coupled at an opening in the case, an electrode terminal for drawing the electrode assembly out through the cap plate, and a vent plate for exhausting high-temperature gas and pressure generated inside the case.

The cap plate has a terminal hole (e.g., a terminal opening) for coupling the electrode terminal and a vent hole (e.g., a vent opening) for installing the vent plate. In addition, a current collecting member for connecting the electrode terminal to the electrode assembly may be included. The terminal hole, the vent hole, and the current collecting member may complicate the configuration of the cap plate, and thus, the cost of the secondary battery may rise.

The above information disclosed in this Background section is for enhancement of understanding of the background of the present disclosure, and therefore, it may contain information that does not constitute prior art.

SUMMARY

An embodiment of the present disclosure provides a secondary battery having a slim yet rigid cap plate.

A secondary battery, according to an embodiment of the present disclosure, includes: a case having a space therein; an electrode assembly in the space in the case; and a cap plate coupled to and sealing the case. The cap plate has a recessed portion and a vent hole in the recessed portion.

A depth (A) at which the recessed portion protrudes from a lower portion (e.g., a lower surface) of the cap plate may be greater than or equal to 0.2 times a thickness of the cap plate and may be less than or equal to the thickness of the cap plate.

A thickness of the cap plate at the recessed portion may be greater than or equal to 0.5 times the thickness of the cap plate and may be less than or equal to the thickness of the cap plate.

A thickness at where the vent hole starts in the recessed portion may be greater than or equal to 0.5 times the thickness of the cap plate and may be less than or equal to the thickness of the cap plate.

A depth at which the recessed portion protrudes from a lower portion of the cap plate may be greater than or equal to the thickness of the cap plate at the recessed portion.

A depth at which the recessed portion protrudes from a lower portion of the cap plate may be greater than or equal to a thickness where the vent hole starts in the recessed portion.

BRIEF DESCRIPTION OF DRAWINGS

FIG. 4 is a table showing rigidity test results for the cap plate shown in FIG. 3.

DETAILED DESCRIPTION

Figure 1:
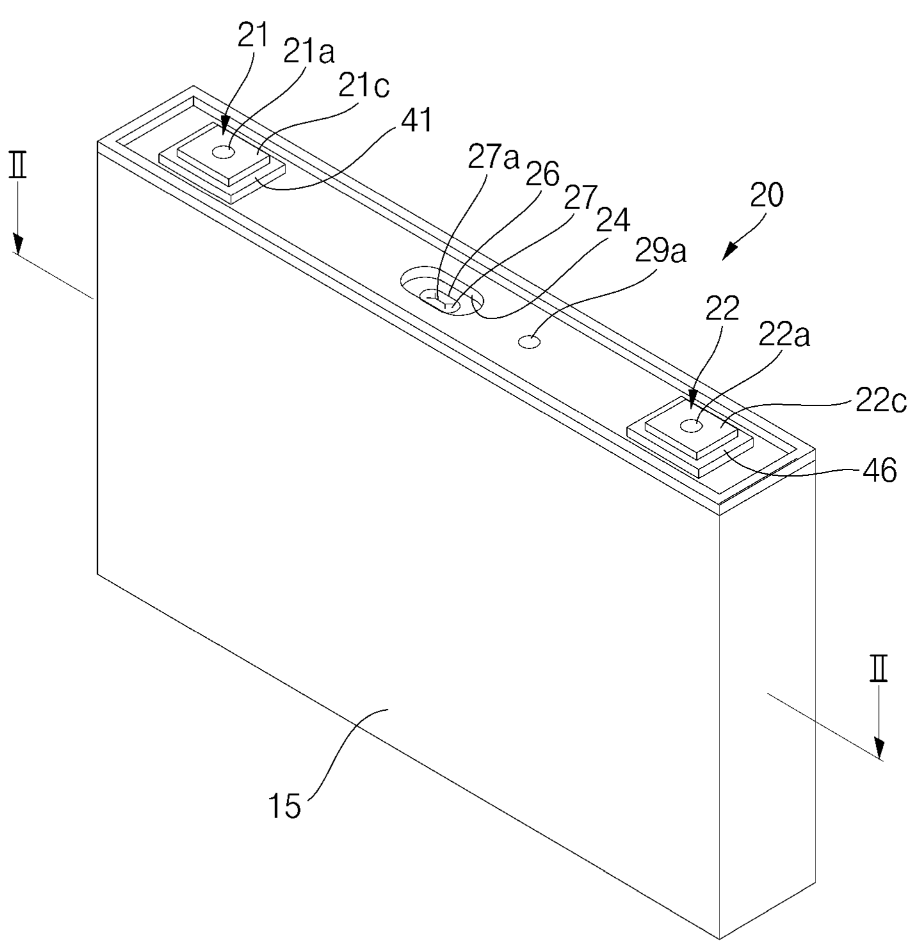
FIG. 1 is a perspective view of a secondary battery according to an embodiment of the present disclosure.

Hereinafter, embodiments of the present disclosure will be described, in detail, with reference to the accompanying drawings. Embodiments of the present disclosure are provided to more completely explain the present disclosure to those skilled in the art, and the following embodiments may be modified in various other forms. Thus, the present disclosure may be embodied in many different forms and should not be construed as being limited to the embodiments described herein. Rather, embodiments are described herein so that this disclosure will be thorough and complete and will convey the aspects and features of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 2:
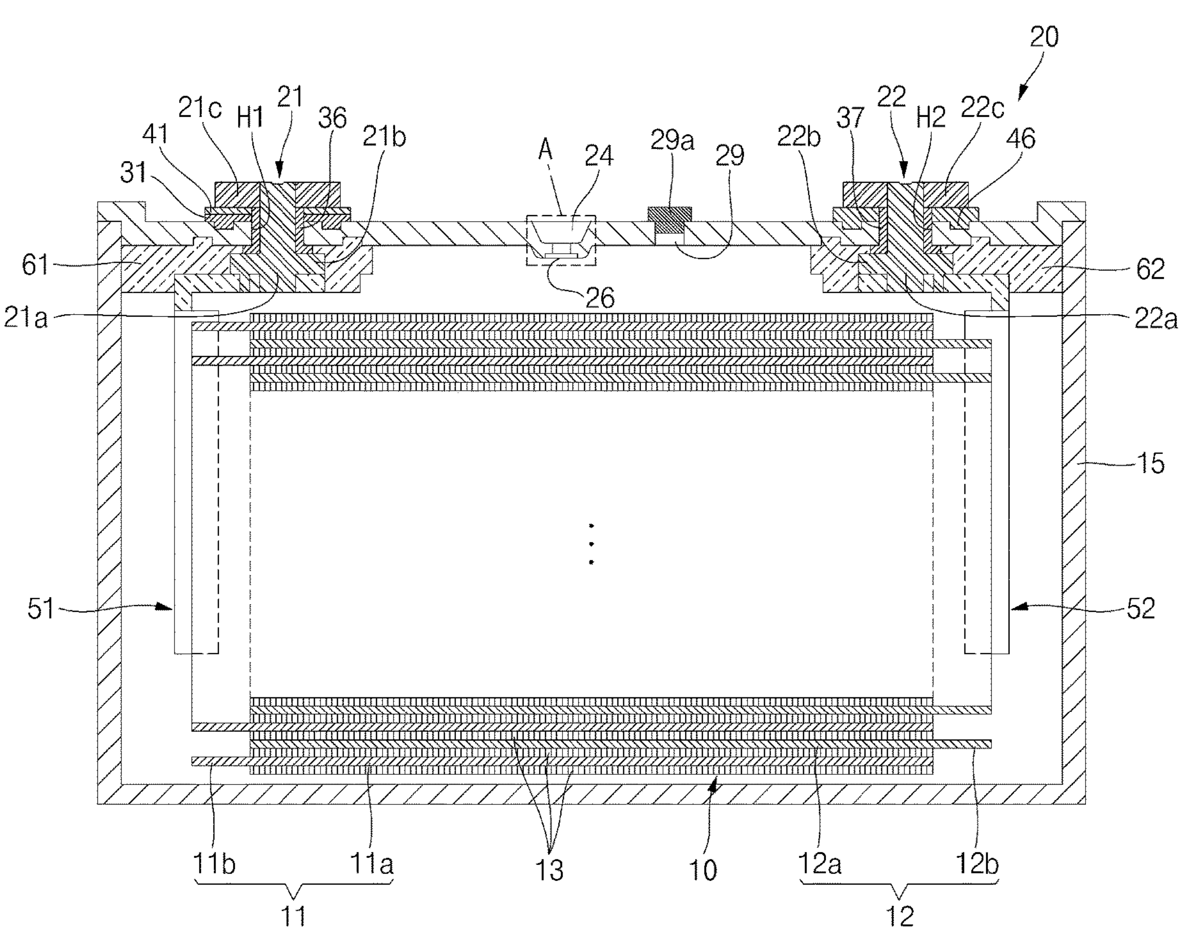
FIG. 2 is a cross-sectional view taken along the line II-II of FIG. 1.
Figure 3:
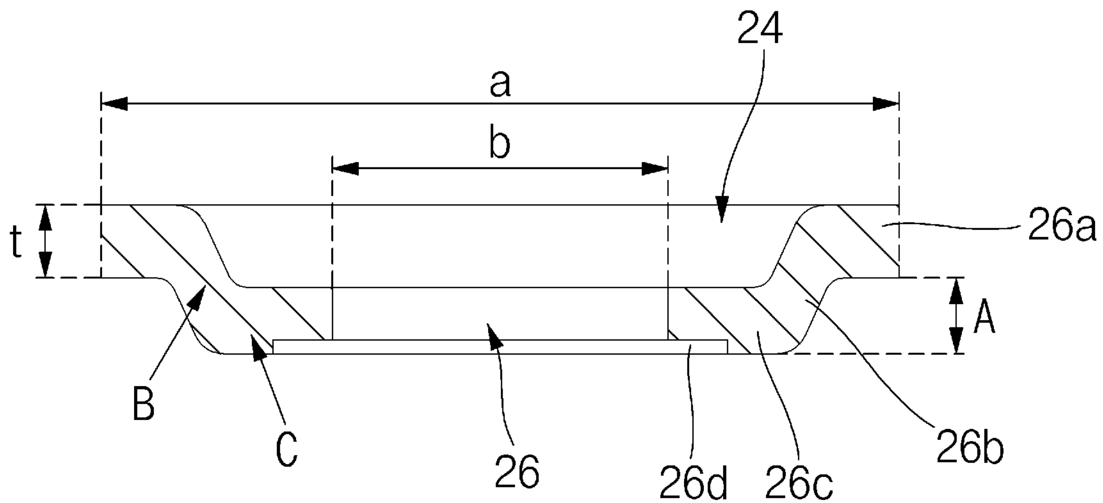
FIG. 3 is an enlarged cross-sectional view of the portion A of FIG. 2.
Figure 5:
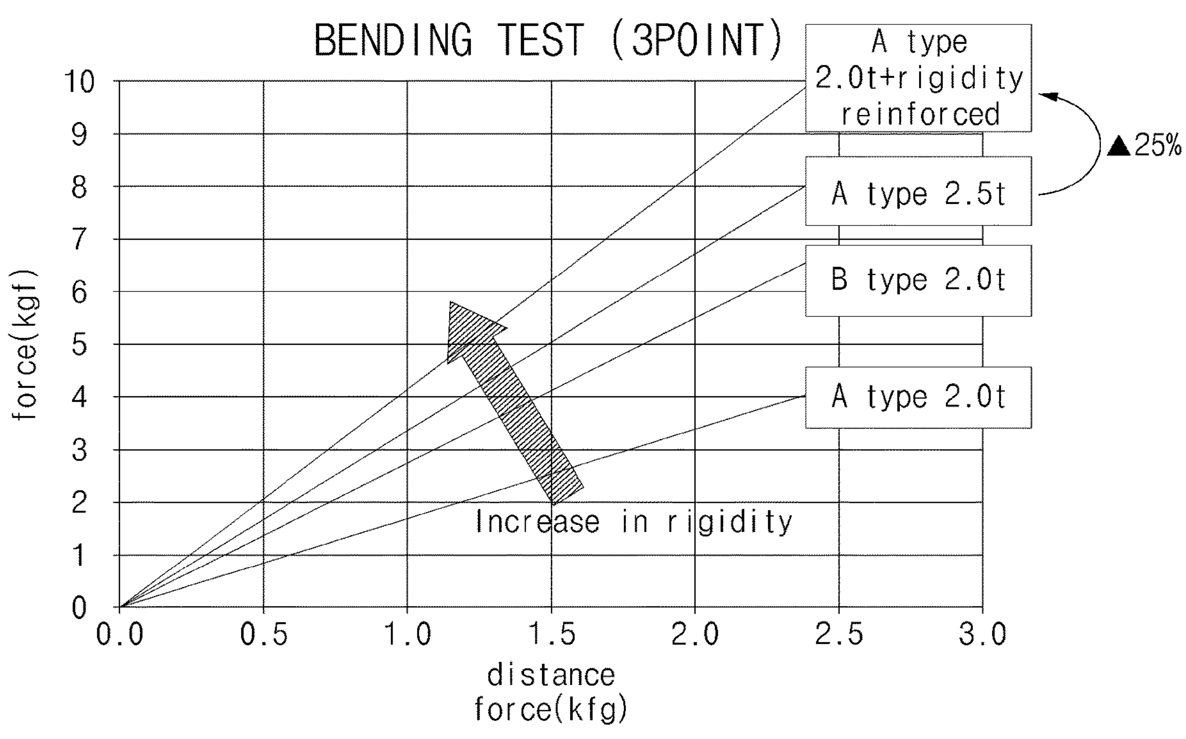
FIG. 5 is a table showing rigidity test results for a cap plate different from that of the cap plate shown in FIG. 3.

FIG. 1 is a perspective view of a secondary battery according to an embodiment of the present disclosure, FIG. 2 is a cross-sectional view taken along the line II-II of FIG. 1, FIG. 3 is an enlarged cross-sectional view of the portion A of FIG. 2, FIG. 4 is a table showing rigidity test results for cap plate shown in FIG. 3, and FIG. 5 is a table showing rigidity test results for a cap plate different from that of the cap plate shown in FIG. 3.

Referring to FIGS. 1 and 2, a secondary battery, according to an embodiment of the present disclosure, includes an electrode assembly 10 for charging and discharging a current, a case 15 accommodating the electrode assembly 10, a cap plate 20 sealing an opening in the case 15, and electrode terminals (e.g., negative and positive electrode terminals) 21 and 22 installed in the cap plate 20.

The electrode assembly 10 may be formed by installing a first electrode (e.g., a negative electrode) 11 and a second electrode (e.g., a positive electrode) 12 on both surfaces of a separator 13, which is an insulator, and winding the negative electrode 11, the separator 13, and the positive electrode 12 in a jelly roll state.

The negative electrode 11 and the positive electrode 12 are current collectors having coated portions 11*a* and 12*a* on which an active material is applied to and uncoated portions 11*b* and 12*b*, which are exposed portions of the current collectors without an active material applied thereto, respectively. The negative electrode 11 and the positive electrode 12 may be made of metal plates.

The uncoated portion 11*b* of the negative electrode 11 is formed at one end of the negative electrode 11 along the wound negative electrode 11 (e.g., at one end of the electrode assembly 10). The uncoated portion 12*b* of the positive electrode 12 is formed at another end of the positive electrode 12 along the wound positive electrode 12 (e.g., at another end of the electrode assembly 10).

Thus, the uncoated portions 11*b* and 12*b* may be disposed at both ends (e.g., opposite ends) of the electrode assembly 10, respectively. In addition, the uncoated portions 11*b* and 12*b* may be disposed parallel to the ends of the electrode assembly 10 facing the cap plate 20.

The case 15 may have a substantially rectangular parallelepiped shape to provide a space (e.g., an internal space) for accommodating the electrode assembly 10 and an electrolyte therein, and the case 15 has an opening connecting the outside and the internal space at one surface of the rectangular parallelepiped shape. The opening allows the electrode assembly 10 to be inserted into the case 15.

The cap plate 20 is installed in the opening in the case 15 to seal the opening in the case 15. For example, the case 15 and the cap plate 20 may be formed of aluminum and welded to each other.

The cap plate 20 further includes terminal holes (e.g., terminal openings) H1 and H2, an electrolyte injection hole (e.g., an electrolyte injection opening) 29, and a recessed portion 24. The electrolyte injection hole 29 allows an electrolyte to be injected into the case 15 after the cap plate 20 is coupled and welded to the case 15. After injecting the electrolyte, the electrolyte injection hole 29 is sealed with a sealing plug 29*a*.

The negative and the positive electrode terminals 21 and 22 are electrically and mechanically connected to the electrode assembly 10 and installed in the terminal holes H1 and H2 of the cap plate 20, respectively. The negative and the positive electrode terminals 21 and 22 are electrically connected to the negative and positive electrodes 11 and 12 of the electrode assembly 10, respectively. Accordingly, the electrode assembly 10 is drawn out of the case 15 through (or by) the negative and the positive electrode terminals 21 and 22.

Because the negative and the positive electrode terminals 21 and 22 have the same structure inside the cap plate 20, the same structures of the negative and the positive electrode terminals 21 and 22 will be described together. Further, because the negative and the positive electrode terminals 21 and 22 form different structures outside the cap plate 20, different structures of the negative and the positive electrode terminals 21 and 22 will be separately described.

The negative and the positive electrode terminals 21 and 22 include rivet terminals 21*a* and 22*a* respectively installed in the terminal holes H1 and H2 in the cap plate 20, flanges 21*b* and 22*b* integrally formed with the rivet terminals 21*a* and 22*a* and extending widely (e.g., protruding laterally) inside the cap plate 20, and plate terminals 21*c* and 22*c* disposed outside the cap plate 20 and connected to the rivet terminals 21*a* and 22*a*, respectively, by riveting or welding.

Negative and positive electrode gaskets 36 and 37 are respectively installed between rivet terminals 21*a*, 22*a* of the negative and the positive electrode terminals 21 and 22 and the inner surfaces of the terminal holes H1 and H2 and seal portions (or areas) between the rivet terminals 21*a*, 22*a* of the negative and the positive electrode terminals 21 and 22 and the cap plate 20 to electrically insulate them.

The negative and positive electrode gaskets 36 and 37 are further installed between the flanges 21*b* and 22*b* and the inner surface of the cap plate 20 to further seal portions (or areas) between the flanges 21*b* and 22*b* and the cap plate 20 and electrically insulate the flanges 21*b* and 22*b* and the cap plate 20 from each other. The negative and positive electrode gaskets 36 and 37 prevent the electrolyte from leaking through the terminal holes H1 and H2 by being installed between the negative and the positive electrode terminals 21 and 22 and the cap plate 20.

The negative and positive electrode lead tabs 51 and 52 electrically and mechanically connect the negative and the positive electrode terminals 21 and 22 to the negative and positive electrodes 11 and 12 of the electrode assembly 10, respectively. For example, by coupling the negative and positive electrode lead tabs 51 and 52 to the bottom ends of the rivet terminals 21*a* and 22*a* and caulking (or sealing) the lower ends, the negative and positive electrode lead tabs 51 and 52 are supported by the flanges 21*b* and 22*b* to be connected to the bottom ends of the rivet terminals 21*a* and 22*a*.

Negative and positive electrode insulating members 61 and 62 are respectively installed between negative and positive electrode lead tabs 51 and 52 and the cap plate 20 to electrically insulate the negative and positive electrode lead tabs 51 and 52 and the cap plate 20 from each other.

In addition, the negative and positive electrode insulating members 61 and 62 are coupled at one side of the cap plate 20 and wrap (e.g., extend around a periphery of) the negative and positive electrode lead tabs 51 and 52 and the rivet terminals 21*a* and 22*a* and the flanges 21*b* and 22*b* to the other side, and thus, the connection structure thereof may be stabilized.

A top plate 41 will be described with respect to the plate terminal 21*c* of the negative electrode terminal 21, and a top plate 46 will be described with respect to the plate terminal 22*c* of the positive electrode terminal 22.

The top plate 41 of the negative electrode terminal 21 is coupled between the plate terminal 21*c* of the negative electrode terminal 21 and the cap plate 20. The top plate 41 is interposed between the plate terminal 21*c* and the cap plate 20 and has an opening for the rivet terminal 21*a* to penetrate therethrough (or pass therethrough).

Accordingly, by coupling the top plate 41 and the plate terminal 21*c* to the top end of the rivet terminal 21*a* and caulking the top end, the top plate 41 and the plate terminal 21*c* are coupled to the top end of the rivet terminal 21*a*. The plate terminal 21*c* is installed outside the cap plate 20 with the top plate 41 interposed between the plate terminal 21*c* and the cap plate 20.

An insulating member 31 is installed between the top plate 41 and the cap plate 20 to electrically insulate the top plate 41 and the cap plate 20 from each other. The cap plate 20 is maintained to be electrically insulated from the negative electrode terminal 21.

The negative electrode gasket 36 is installed to extend further between the rivet terminal 21*a* and the top plate 41. For example, the negative electrode gasket 36 prevents the rivet terminal 21*a* and the top plate 41 from being electrically directly connected.

The top plate 46 of the positive electrode terminal 22 electrically connects the plate terminal 22*c* of the positive electrode terminal 22 and the cap plate 20. For example, the top plate 46 is interposed between the plate terminal 22*c* and the cap plate 20 and has an opening allowing the rivet terminal 22*a* to penetrate (or pass) therethrough.

Accordingly, by coupling the top plate 46 and the plate terminal 22*c* to the top end of the rivet terminal 22*a* and caulking the top end, the top plate 46 and the plate terminal 22*c* are coupled to the top end of the rivet terminal 22*a*. The plate terminal 22*c* is installed outside the cap plate 20 with the top plate 46 interposed between the plate terminal 22*c* and the cap plate 20.

A positive electrode gasket 37 is installed to extend further between the rivet terminal 22*a* and the top plate 46. For example, the positive electrode gasket 37 prevents the rivet terminal 22*a* and the top plate 46 from being directly electrically connected to each other.

Accordingly, the rivet terminal 22*a* is electrically connected to the top plate 46 via the plate terminal 22*c*. Thus, the cap plate 20 may be connected to the positive electrode terminal 22 to be charged as (e.g., to act as) a positive electrode.

A recessed portion 24 is formed in at least one region of the cap plate 20 (or in a region of the case 15). For example, the recessed portion 24 may be formed by forming a thin film plate integrally with the cap plate 20. The recessed portion 24 may protrude to a depth (e.g., a predetermined depth) in a direction toward the electrode assembly 10 through a coining process on the thin film plate integrally formed with the cap plate 20.

A vent hole (e.g., a vent opening) 26 may be formed in the recessed portion 24 and, during a cell event (e.g., an over-pressure event), a vent plate 27, which is formed integrally with the cap plate 20 or formed separately and attached thereto, may burst to discharge gas from the inside of the secondary battery (e.g., from the inside of the case 15) to the outside. The vent hole 26 and the vent plate 27 are integrally formed with the cap plate 20 through a coining process. The vent hole 26 and the vent plate 27 may reduce the number of elements and simplify the structure of the cap plate 20 compared to a configuration in which a vent plate is separately manufactured and welded to a vent hole.

The vent plate 27 is installed to seal the vent hole 26 to discharge the internal pressure in the secondary battery during a cell event. For example, when the internal pressure reaches a set (or reference) pressure, the vent plate 27 bursts the vent hole 26 open. The vent plate 27 has a notch 27*a* that facilitates the bursting at the set (or reference) pressure.

Referring to FIG. 3, according to an embodiment of the present disclosure, to prevent the vent hole 26 from buckling due to a Y-axis crush of the secondary battery, the recessed portion 24 of the cap plate 20 is inwardly formed in at least one region of the cap plate 20 and has the vent hole 26 formed therein.

The vent hole 26 is attached and sealed by the vent plate 27 having the notch 27*a* formed therein. A stepped region 26*d* (e.g., a recessed portion) is formed in a lower region of the vent hole 26 for coupling with the vent plate 27.

Referring to FIGS. 3 and 4, the depth (A) which the recessed portion 24 protrudes into the case 15 (e.g., protrudes from the lower portion of the cap plate 20) is greater than or equal to about 0.2 times a thickness (t) of the cap plate 20 and is less than or equal to the thickness (t) of the cap plate 20, as shown in Expression 1 below:

$$0.2t \leq A \leq t \qquad \text{Expression 1:}$$

wherein A is the thickness (e.g., the protruding depth) from the lower surface of the cap plate 20 to the lower surface of the protruding recessed portion 24, and t is the top-to-bottom thickness of the cap plate 20 in the region 26*a* before the cap plate 20 is formed and inclined (e.g., in the region 26*a* at where the cap plate 20 is not thinned or protruded).

In addition, the thickness (B) of the cap plate 20 at an area where the recessed portion 24 is formed is greater than or equal to about 0.5 times the thickness (t) of the cap plate 20 and less than the thickness (t) of the cap plate 20, as shown in Expression 2 below:

$$0.5t \leq t \qquad \text{Expression 2:}$$

wherein B is the thickness at the inclined region between the cap plate 20 and the recessed portion 24, where the cap plate 20 starts to be inclined toward the recessed portion 24, to the flat or substantially flat region where the vent hole 26 is formed.

The thickness (C) of the cap plate 20 at a position where the vent hole 26 starts in the recessed portion 24 may be greater than or equal to about 0.5 times the thickness (t) of the cap plate 20 and may be less than or equal to the thickness (t) of the cap plate 20, as shown in Expression 3 below:

$$0.5t \leq C \leq t \qquad \text{Expression 3:}$$

wherein C is the top-bottom thickness of the flat recessed region 26*c* adjacent to where the vent hole 26 is formed.

In addition, the depth (A) at which the recessed portion 24 further protrudes from the lower portion of the cap plate 20 is formed to be greater than or equal to the thickness (B) of the cap plate 20 at an area where the recessed portion 24 is formed, as shown in Expression 4 below:

$$B \leq A. \qquad \text{Expression 4:}$$

In addition, the depth (A) at which the recessed portion 24 further protrudes from the lower portion of the cap plate 20 is formed to be greater than or equal to the thickness (C) of an area of the recessed portion 24 adjacent to where the vent hole 26 starts, as shown in Expression 5 below:

$$C \leq A. \qquad \text{Expression 5:}$$

As shown in FIGS. 4 and 5, when the cap plate 20 and the recessed portion 24 are formed to have the depth and thickness satisfying the conditions of Expressions 1 to 5, the cross-sectional moment, that is, rigidity, of the cap plate 20 is significantly improved compared to a cap plate and vent hole that does not satisfy the conditions of Expressions 1 to 5.

That is, even when a cap plate has a greater thickness than the cap plate 20 according to embodiment of the present disclosure, by forming the cap plate 20 and the recessed portion 24 to have the depth and thickness satisfying the conditions of Expressions 1 to 5, the rigidity of the cap plate 20 is further increased.

In addition, when the cap plate 20 according to embodiments of the present disclosure has the same thickness as that of a same type of cap plate, the cap plate 20 may be twice as strong and an approximately 25% strength reinforcement effect may be achieved compared to a case where the thickness thereof is further increased.

When a different type of cap plate than the cap plate 20 according to embodiment of the present disclosure is formed to be more thick, a strength reinforcement effect of approximately 1.5 times may be achieved.

Expressions 1 to 5 assume that the width (a) of the recessed portion 24 and the width (b) of the vent hole 26 have the same dimensions.

Accordingly, in an embodiment of the present disclosure, the cap plate 20 may be designed to be relatively thin while increasing the strength at the region where the vent hole 26 is formed, thereby providing a slimmer (e.g., thinner) cap plate for the secondary battery.

In addition, in an embodiment of the present disclosure, the cap plate 20 is relatively thin, and thus, the material cost of the secondary battery can be reduced and the welding defect rate can be improved by preventing the cap plate 20 from sagging during an insertion process due to its increased strength.

As described above, embodiments of the present disclosure provide a secondary battery having increased rigidity and preventing a short circuit by forming a protruding region in a region of a cap plate at where a vent is to be formed through a forming process.

The foregoing embodiments are only some of the embodiments for carrying out the secondary battery according to the present disclosure, which is not limited to these embodiments. Thus, it will be understood by a person skilled in the art that various changes in form and details may be made to the embodiments described herein without departing from the spirit and scope of the present disclosure as defined by the following claims and their equivalents.

What is claimed is:

1. A secondary battery comprising:
a case having a space therein;
an electrode assembly accommodated in the space in the case; and
a cap plate coupled to and sealing the case, the cap plate having a protrusion formed by protruding at least one region of the cap plate towards the electrode assembly and a vent hole in the protrusion,
wherein a vent plate sealing the vent hole and including a notch is disposed on the protrusion, and
wherein a height of the protrusion is greater than a thickness of the vent plate and less than or equal to a thickness of the cap plate.

2. The secondary battery of claim 1, wherein the height of the protrusion is greater than or equal to 0.2 times of a thickness of the cap plate and is less than or equal to the thickness of the cap plate.

3. The secondary battery of claim 1, wherein a thickness of the cap plate at the protrusion is greater than or equal to 0.5 times the thickness of the cap plate and is less than or equal to the thickness of the cap plate.

4. The secondary battery of claim 1, wherein a thickness of the cap plate where the vent hole starts in the protrusion is greater than or equal to 0.5 times the thickness of the cap plate and is less than or equal to the thickness of the cap plate.

5. The secondary battery of claim 1, wherein the height of the protrusion is greater than or equal to a thickness of the cap plate at the protrusion.

6. The secondary battery of claim 1, wherein the height of the protrusion is greater than or equal to a thickness of the cap plate where the vent hole starts in the protrusion.

7. The secondary battery of claim 1, wherein the height of the protrusion is less than a distance between the protrusion and the electrode assembly.

8. The secondary battery of claim 1, further comprising an electrode terminal inserted into a terminal opening in the cap plate, and
wherein a distance between the protrusion and the electrode terminal is greater than a long width of the protrusion.

9. The secondary battery of claim 1, further comprising an electrode terminal inserted into a terminal opening in the cap plate, and wherein a bottom surface of the protrusion and the electrode terminal overlap horizontally.

* * * * *